(12) United States Patent
Hirayama et al.

(10) Patent No.: US 8,580,148 B2
(45) Date of Patent: Nov. 12, 2013

(54) PHOSPHOR AND METHOD FOR PRODUCING SAME

(75) Inventors: Seiko Hirayama, Osaka (JP); Keita Kobayashi, Osaka (JP); Junya Ishii, Osaka (JP); Mizuho Wada, Osaka (JP); Shinji Nakahara, Osaka (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 1018 days.

(21) Appl. No.: 10/549,585

(22) PCT Filed: Mar. 12, 2004

(86) PCT No.: PCT/JP2004/003326
§ 371 (c)(1),
(2), (4) Date: Dec. 1, 2005

(87) PCT Pub. No.: WO2004/087833
PCT Pub. Date: Oct. 14, 2004

(65) Prior Publication Data
US 2006/0091360 A1    May 4, 2006

(30) Foreign Application Priority Data

Mar. 14, 2003 (JP) .................. 2003-069228
Apr. 3, 2003 (JP) .................. 2003-100646
Jul. 30, 2003 (JP) .................. 2003-282828

(51) Int. Cl.
*C09K 11/77*    (2006.01)

(52) U.S. Cl.
USPC ................................ 252/301.4 R

(58) Field of Classification Search
USPC .................................. 252/301.4 R
See application file for complete search history.

(56) References Cited

U.S. PATENT DOCUMENTS

| | | | |
|---|---|---|---|
| 3,753,759 A * | 8/1973 | Bouchard et al. | ............... 427/67 |
| 5,611,959 A * | 3/1997 | Kijima et al. | ........... 252/301.4 R |
| 5,951,915 A | 9/1999 | Hase et al. | |
| 6,010,644 A | 1/2000 | Fu et al. | |
| 6,096,243 A * | 8/2000 | Oshio et al. | ............. 252/301.4 R |
| 6,099,753 A | 8/2000 | Yoshimura et al. | |
| 6,190,577 B1 * | 2/2001 | Hase et al. | ............. 252/301.4 R |

FOREIGN PATENT DOCUMENTS

| | | | | |
|---|---|---|---|---|
| EP | 0622440 | | 4/1996 | |
| JP | 07-011250 | | 1/1995 | |
| JP | 10-195428 | | 7/1998 | |
| JP | 10-204429 | | 8/1998 | |
| JP | 10-298548 | | 11/1998 | |
| JP | 11-021552 | | 1/1999 | |
| JP | 11-67158 | | 3/1999 | |
| JP | 2000-1672 | | 1/2000 | |
| JP | 2000-144129 | | 5/2000 | |
| JP | 2000-212557 | | 8/2000 | |
| JP | 2000-234088 | | 8/2000 | |
| JP | 2000-309775 | | 11/2000 | |
| JP | 2001-123162 | | 5/2001 | |
| JP | 2001-271064 | | 10/2001 | |
| JP | 2002-348570 | | 12/2002 | |
| JP | 2003-336056 | | 11/2003 | |
| JP | 2003336055 A * | 11/2003 | ............. | C09K 11/64 |
| JP | 2004-67739 | | 3/2004 | |

* cited by examiner

*Primary Examiner* — Melvin C Mayes
*Assistant Examiner* — Stefanie Cohen
(74) *Attorney, Agent, or Firm* — Jordan and Hamburg LLP

(57) ABSTRACT

It is an object of the present invention to provide an alkaline earth metal aluminate phosphor having good heat resistance and durability against vacuum ultraviolet rays and ultraviolet rays, among others, and a method of producing the same.
An alkaline earth metal aluminate phosphor containing bivalent europium as an activator,
which contains at least one element (e) selected from the group consisting of indium, tungsten, niobium, bismuth, molybdenum, tantalum, thallium and lead.

12 Claims, No Drawings

PHOSPHOR AND METHOD FOR PRODUCING SAME

TECHNICAL FIELD

The present invention relates to a phosphor and a method of producing the same.

BACKGROUND ART

In recent years, various phosphors have been used in plasma display panels (hereinafter referred to as PDPs). Among such phosphors, alkaline earth metal aluminate phosphors containing bivalent europium as an activator, for example $(Ba,Sr)MgAl_{10}O_{17}:Eu^{2+}$, are used as blue phosphors.

When exposed to elevated temperatures or to vacuum ultraviolet rays, ultraviolet rays or the like for phosphor excitation, such alkaline earth metal aluminate phosphors containing bivalent europium as an activator deteriorate and decrease in luminance. The mechanism so far proposed as the cause therefor consists in the oxidation of bivalent Eu, which forms luminescence centers in the blue phosphors, in particular, to the trivalent form due to the oxidative effect of heating on the phosphor surface, resulting in the loss of bivalent blue luminescence centers and the decrease in luminance.

The phosphors may be subjected to heating at elevated temperatures in the step of molding for use in certain fields of application. In the process of manufacturing PDPs, for instance, partitions called ribs are formed on the back face glass sheet, and the respective fluorescence substances each in the form of a paste prepared by using a binder and a solvent are applied to respective partition-surrounded areas without color mixing. The glass sheet is then heated at 400 to 500° C. for binder elimination in the manner of firing and for fusion bonding to a front face glass sheet. It is suggested that, in such a firing step, the firing is carried out in a high humidity environment as a result of not only the oxidative action but also the evaporation of the moisture originally contained in dielectrics, electrodes and other materials than the phosphors, possibly affecting the fluorescent materials. Therefore, as far as blue phosphors are concerned, it is a great problem to inhibit luminance decreases as well as emission shifting in the heating/firing step.

For deterioration prevention, some attempts have already been made to prevent the deterioration by chemical treatment of the phosphor surface (e.g. Japanese Kokai Publication H10-195428, Japanese Kokai Publication H10-298548, Japanese Kokai Publication H10-204429). However, these methods consist in coating the surface with boric acid or a compound of such an element as antimony or silica and, therefore, it is difficult to entirely prevent the oxidative deterioration and, in addition, a problem arises, namely the luminance decreases due to the covering of the phosphor surface with some other substance.

Another problem is that a phosphor, once colored and reduced in powder whiteness, absorbs the fluorescence emitted, resulting in reduced function. Therefore, it is desirable that the phosphor has high powder whiteness. As means for preventing the luminance of a phosphor from decreasing, there has been disclosed a method of producing phosphors which comprises firing in a reducing atmosphere, followed by firing in an oxidizing atmosphere (e.g. Japanese Kokai Publication 2002-348570). Such method, however, is a method of producing alkaline earth metal silicoaluminate phosphors but is not intended for increasing the powder whiteness of a phosphor.

SUMMARY OF THE INVENTION

In view of the foregoing, it is an object of the present invention to provide an alkaline earth metal aluminate phosphor having good heat resistance and durability against vacuum ultraviolet rays and ultraviolet rays, among others, and a method of producing the same.

The present invention relates to an alkaline earth metal aluminate phosphor containing bivalent europium as an activator, which contains at least one element (e) selected from the group consisting of indium, tungsten, niobium, bismuth, molybdenum, tantalum, thallium and lead.

The above-mentioned alkaline earth metal aluminate phosphor may be one obtained by a process comprising;

the step (1-1) of firing, in a reducing atmosphere, a mixture of precursor compounds of barium and/or strontium (a), magnesium (b), aluminum (c), europium (d) and at least one element (e) selected from the group consisting of indium, tungsten, niobium, bismuth, molybdenum, tantalum, thallium and lead, respectively, and the step (1-2) of firing, in an oxidizing atmosphere, the fired product obtained in the step (1-1).

The above-mentioned alkaline earth metal aluminate phosphor may be one obtained by a process comprising;

the step (2-1) of mixing a fired product (A) with a compound (B), the fired product (A) comprising barium and/or strontium (a), magnesium (b), aluminum (c) and europium (d), the compound (B) being at least one compound selected from the group consisting of indium compounds, tungsten compounds, niobium compounds, bismuth compounds, molybdenum compounds, tantalum compound, thallium compounds and lead compounds; and the step (2-2) of firing, in an oxidizing atmosphere, the mixture obtained in the step (2-1) or a fired product of the mixture obtained in the step (2-1), the step (2-2) being preceded, at least once, by firing in a reducing atmosphere.

In the above-mentioned alkaline earth metal aluminate phosphor, the content of at least one element (e) selected from the group consisting of indium, tungsten, niobium, bismuth, molybdenum, tantalum, thallium and lead is preferably within the range of 0.0001 to 0.01 mole per mole of the aluminum element.

The above-mentioned alkaline earth metal aluminate phosphor containing bivalent europium as an activator is preferably represented by the following general formula (1)

$$(Ba_{1-X}Sr_X)_{1-Y}Eu_YMgAl_{10}O_{17} \qquad (1)$$

in the formula, X satisfies the relationship of $0 \leq X \leq 0.3$ and Y satisfies the relationship of $0 \leq Y \leq 0.2$.

Preferably, the above-mentioned alkaline earth metal aluminate phosphor has a powder whiteness of not lower than 85 as expressed in terms of W value.

The present invention also relates to a method of producing alkaline earth metal aluminate phosphors, which comprises a step (1-1) of firing, in a reducing atmosphere, a mixture of precursor compounds of barium and/or strontium (a), magnesium (b), aluminum (c), europium (d) and at least one element (e) selected from the group consisting of indium, tungsten, niobium, bismuth, molybdenum, tantalum, thallium and lead, respectively, or a fired product of said mixture.

Preferably, the above-mentioned method of producing alkaline earth metal aluminate phosphors comprises a step (1-2) of firing, in an oxidizing atmosphere, the fired product obtained in the step (1-1) of firing in a reducing atmosphere.

Preferably, the above-mentioned method of producing alkaline earth metal aluminate phosphors comprises a step (1-3) of firing in an oxidizing atmosphere in advance of the step (1-1) of firing in a reducing atmosphere.

The present invention also relates to a method of producing alkaline earth metal aluminate phosphors, wherein the method comprises;

the step (2-1) of mixing a fired product (A) with a compound (B), the fired product (A) comprising barium and/or strontium (a), magnesium (b), aluminum (c) and europium (d), the compound (B) being at least one compound selected from the group consisting of indium compounds, tungsten compounds, niobium compounds, bismuth compounds, molybdenum compounds, tantalum compound, thallium compounds and lead compounds; and the step (2-2) of firing, in an oxidizing atmosphere, the mixture obtained in the step (2-1) or a fired product of the mixture obtained in the step (2-1), the step (2-2) being preceded, at least once, by firing in a reducing atmosphere.

Preferably, the above-mentioned fired product (A) further contains at least one element (e) selected from the group consisting of indium, tungsten, niobium, bismuth, molybdenum, tantalum, thallium and lead.

The above-mentioned firing in a reducing atmosphere may be applied to the mixture obtained in the step (2-1).

The above-mentioned firing in a reducing atmosphere may be carried out on the occasion of firing for producing the fired product (A) comprising barium and/or strontium (a), magnesium (b), aluminum (c) and europium (d).

DETAILED DESCRIPTION OF THE INVENTION

In the following, the present invention is described in detail.

The phosphor of the invention is an alkaline earth metal aluminate phosphor containing bivalent europium as an activator. Usable as the base phosphor are generally known ones, and there may be mentioned, for example, alkaline earth metal aluminate phosphors comprising barium and/or strontium, europium, magnesium, aluminum and oxygen. Preferred as such alkaline earth metal aluminate phosphors are those represented by the following general formula (1):

$$(Ba_{1-X}Sr_X)_{1-Y}Eu_YMgAl_{10}O_{17} \quad (1)$$

in the formula, X satisfies the relationship of $0 \leq X \leq 0.3$ and Y satisfies the relationship of $0 \leq Y \leq 0.2$.

The alkaline earth metal aluminate phosphor of the invention is an alkaline earth metal aluminate phosphor containing bivalent europium as an activator and contains at least one element (e) selected from the group consisting of indium, tungsten, niobium, bismuth, molybdenum, tantalum, thallium and lead. The element (e) may occur either within the alkaline earth metal aluminate phosphor or on the surface in a localized manner, such as resulting from surface treatment with a compound of that element. Preferably, however, it occurs within the alkaline earth metal aluminate phosphor. The phosphor may contain two or more element (e) species simultaneously or contain only one element (e) species.

Among the elements enumerated above, tungsten, niobium and bismuth are preferred, since they give phosphors having good heat resistance and durability against vacuum ultraviolet rays and ultraviolet rays, among others; and tungsten is most preferred.

The content of the at least one element (e) selected from the group consisting of indium, tungsten, niobium, bismuth, molybdenum, tantalum, thallium and lead in the alkaline earth metal aluminate phosphor of the invention is preferably within the range of 0.0001 to 0.01 mole per mole of the aluminum element. At levels lower than 0.0001 mole, the effects of the addition will be little and, at levels exceeding 0.01 mole, the luminance will unfavorably become excessively low. The content level range differs depending on the element species employed. In the case of tungsten and/or niobium, for instance, a preferred lower limit to the above range is 0.0003 mole, and a preferred upper range is 0.007 mole. Further, a most preferred lower limit to the above range is 0.0005 mole, and a most preferred upper limit is 0.003 mole. The content of the element (e) can be adjusted to a level within a specific range by adjusting the mixing ratio between the precursor compound of aluminum and the precursor compound of the above-mentioned element in the mixture of the precursor compounds used as the starting materials.

The alkaline earth metal aluminate phosphor of the invention may further contain one or more elements other than the element (e) at levels at which they will never adversely affect the physical properties of the phosphor. Since, however, the presence of an impurity may influence the luminance, heat resistance, durability against vacuum ultraviolet ray and so forth, the content of elements other than the essential components should preferably be lower than 1%.

Furthermore, the alkaline earth metal aluminate phosphor of the invention preferably has a powder whiteness of not lower than 85 as expressed in terms of W value. The alkaline earth metal aluminate phosphor with a powder whiteness of not lower than 85 as expressed in terms of W value is preferred since it will not absorb the fluorescence emitted but can send out fluorescence efficiently. The W value is calculated from the values of L (brightness), a (chroma) and b (hue) according to Hunter's color model, by using the following formula (2):

$$W=100-\{(100-L)^2+(a^2+b^2)\}^{1/2} \quad (2)$$

When the W value is smaller than 85, high levels of absorption of the fluorescence emitted will result and, possibly, no good phosphor performance characteristics may be acquired. More preferably, the W value is 90 or higher. In the following, the method of producing alkaline earth metal aluminate phosphors of the invention is described referring to an example thereof. It is to be noted that the alkaline earth metal aluminate phosphor of the invention is not limited to the one produced by the production method described below.

The alkaline earth metal aluminate phosphor of the invention can be obtained by the step (1-1) of firing, in a reducing atmosphere, a mixture of precursor compounds of the respective elements (barium and/or strontium (a), magnesium (b), aluminum (c), europium (d) and at least one element (e) selected from the group consisting of indium, tungsten, niobium, bismuth, molybdenum, tantalum, thallium and lead), which are the main constituents of the alkaline earth metal aluminate phosphor, or the fired product of such mixture.

The precursor compounds are not particularly restricted but each may be an oxide or any of compounds capable of being converted to oxides upon firing.

The precursor compound of barium is not particularly restricted but includes, for example, barium oxide, barium carbonate, barium nitrate, barium sulfate, barium sulfide, barium chloride and barium hydroxide. The precursor compound of strontium is not particularly restricted but includes, for example, strontium oxide, strontium carbonate, strontium nitrate, strontium sulfate, strontium sulfide, strontium chloride and strontium hydroxide. The precursor compound of magnesium is not particularly restricted but includes, for example, magnesium oxide, basic magnesium carbonate and magnesium hydroxide. The precursor compound of aluminum is not particularly restricted but includes, for example, aluminum oxide, aluminum nitrate, aluminum sulfate and aluminum chloride. The precursor compound of europium is not particularly restricted but includes, for example, europium oxide, europium carbonate, europium chloride and europium acetate. The oxidation number of the metal element is not particularly restricted, either.

The precursor compound of indium is not particularly restricted but includes, for example, indium oxide, indium trichloride, indium nitrate, indium hydroxide and indium sulfate. The oxidation number of the metal element is not particularly restricted, either. The precursor compound of tungsten is not particularly restricted but includes, for example, tungsten oxide, ammonium tungstate and tungsten hexachloride. The oxidation number of the metal element is not particularly restricted, either. The precursor compound of niobium is not particularly restricted but includes, for example, niobium oxide and niobium pentoxide. The oxidation number of the metal element is not particularly restricted, either. The precursor compound of bismuth is not particularly restricted but includes, for example, bismuth oxide and bismuth nitrate. The oxidation number of the metal element is not particularly restricted, either. The precursor compound of molybdenum is not particularly restricted but includes, for example, molybdenum oxide, ammonium molybdate and molybdenum chloride. The oxidation number of the metal element is not particularly restricted, either.

The precursor compound of tantalum is not particularly restricted but includes, for example, tantalum oxide, tantalum chloride and tantalum fluoride. The oxidation number of the metal element is not particularly restricted, either. The precursor compound of thallium is not particularly restricted but includes, for example, thallium oxide, thallium carbonate and thallium nitrate. The oxidation number of the metal element is not particularly restricted, either. The precursor compound of lead is not particularly restricted but includes, for example, lead oxide, lead carbonate and lead nitrate. The oxidation number of the metal element is not particularly restricted, either.

The compounds to be used as the precursor compounds each preferably has a purity as high as possible and, in particular, is preferably free of any impurity other than the volatile constituents or contains only a slight amount of such an impurity. If such an impurity is present in a starting material, the physical properties of the product alkaline earth metal aluminate phosphor may unfavorably be modified. It is preferable that each starting material have a purity of 99% or higher. The above-mentioned respective precursor compounds are blended together, to give a mixture, in such proportions that they give the proportions of the respective elements in the alkaline earth metal aluminate phosphor to be produced.

In producing the alkaline earth metal aluminate phosphor of the invention, a flux may further be used. The flux is not particularly restricted but is preferably one capable of functioning as a phosphor particle growth promoter and volatilizing without influencing the composition of the phosphor, for example magnesium fluoride or aluminum fluoride.

The mixture of the precursor compounds, if necessary further containing the flux, can be prepared mixing together the respective components mentioned above by any of the conventional methods.

The method of mixing is not particularly restricted but may be any of those capable of causing homogeneous mixing without allowing aggregation of each individual component. More specifically, there may be mentioned, for example, the dry mixing method using a ball mill or blender, for instance; the method comprising wet mixing in the presence of a solvent using a homogenizer or a like agitator, a ball mill, a bead mill or a like media grinder, followed by drying; the method comprising preparing an aqueous solution of precursor compounds each in a water-soluble salt form, precipitating the precursor each in an insoluble salt form by pH adjustment with a pH adjusting agent so as to give a predetermined composition, washing the precipitate and drying the same; and the method comprising preparing an aqueous solution of precursor compounds each in a water-soluble salt form, then preparing a W/O type emulsion using the solution and an oil, together with a dispersant, heating and dehydrating the emulsion and recovering the resulting oleaginous dispersion of the precursor mixture.

The alkaline earth metal aluminate phosphor of the invention can be obtained by firing the above mixture in a reducing atmosphere. The firing is preferably carried out at a temperature within the range of 1000 to 1700° C. When the firing temperature is lower than 1000° C., the product alkaline earth metal aluminate phosphor may not occur as perfect crystals or, although the alkaline earth metal aluminate phosphor forms crystals, the crystallizability may markedly decline. Temperatures higher than 1700° C. may give excessively large particles and cause marked deteriorations in performance characteristics, unfavorably making particle dispersion difficult due to strong intercrystalline fusion bonding and thus markedly inhibiting uniform fluorescent film formation. The above-mentioned firing is required to be carried out in a reducing atmosphere so that the fluorescence center europium may be reduced. Thus, the firing is carried out in a reducing atmosphere. The reducing atmosphere conditions are not particularly restricted but the firing is carried out, for example, in a nitrogen-hydrogen mixed gas atmosphere. In the firing in a nitrogen-hydrogen mixed gas atmosphere, the mixing ratio of nitrogen to hydrogen is preferably 99.9/0.1 to 80/20 (by volume).

The reaction time in the firing in a reducing atmosphere varies depending on the reaction temperature and, for the reaction to proceed satisfactorily, a reaction time of 0.5 to 10 hours, for instance, is employed, where upon the desired alkaline earth metal aluminate phosphor can be obtained with great efficiency.

In the above-mentioned method of producing alkaline earth metal aluminate phosphors, the firing in a reducing atmosphere may be preceded by an arbitrary number of firing steps each in an arbitrary atmosphere according to need. As such firing prior to the firing in a reducing atmosphere, there may be mentioned, for example, the firing in an oxidizing atmosphere.

As the above-mentioned optional firing in an oxidizing atmosphere, which is not particularly restricted, there may be mentioned, for example, the firing in the ambient atmosphere or in a nitrogen-oxygen mixed gas atmosphere. The optional firing in an oxidizing atmosphere is preferably carried out at a temperature of 1000 to 1700° C. The reaction time in the optional firing in an oxidizing atmosphere varies depending on the reaction temperature; for the reaction to proceed satisfactorily, a reaction time of 0.5 to 10 hours, for instance, is employed, whereupon the intended purpose can be accomplished efficiently. In cases where the firing in a reducing atmosphere is carried out after the above-mentioned firing in an arbitrary atmosphere, the firing in a reducing atmosphere is preferably carried out after appropriate grinding of the fired product in an arbitrary atmosphere.

The alkaline earth metal aluminate phosphor obtained by the method described above is preferably ground to adjust the particle diameter. Usable as the grinder to be used in the above-mentioned grinding are dry grinders such as hammer mills, fluid energy mills and mixing mullers, and wet grinders such as ball mills and bead mills. In the above-mentioned grinding, excessively intense grinding may result in marked deteriorations in phosphor characteristics and, therefore, it is necessary to select an adequate grinder or mill and employ best working conditions. The classification procedure using a liquid cyclone or the like may also be properly utilized. Such a method of producing alkaline earth metal aluminate phosphors also constitutes an aspect of the present invention.

Preferably, the above-mentioned method of producing alkaline earth metal aluminate phosphors further comprises the step (1-2) of firing, in an oxidizing atmosphere, the fired product obtained in the above-mentioned step (1-1). By carrying out the step (1-2) of firing in an oxidizing atmosphere, it becomes possible to increase the powder whiteness of the alkaline earth metal aluminate phosphor.

The alkaline earth metal aluminate phosphor of the invention shows improved luminance maintaining performance as a result of addition of at least one element (e) selected from the group consisting of indium, tungsten, niobium, bismuth, molybdenum, tantalum, thallium and lead. However, when the firing in a reducing atmosphere is carried out in the presence of such an element added, the element (e) is reduced, resulting in coloration or an increase in coloration. Namely, in a reducing atmosphere, the element (e) is converted to a highly coloring lower valence substance, which reduces the powder whiteness of the product phosphor and lowers the luminance as a result through absorption of the light emitted. Therefore, it is desirable to further increase the powder whiteness by carrying out the above-mentioned step (1-2).

Thus, owing to its containing the element (e) and, further, when prepared by the firing in an oxidizing atmosphere as the last step, the alkaline earth metal aluminate phosphor of the invention can become a phosphor high in powder whiteness and durable against heating in the production process and irradiation with ultraviolet rays, vacuum ultraviolet rays, etc.

The firing in an oxidizing atmosphere as the last step is not particularly restricted but mention may be made of the firing in the ambient atmosphere or in a nitrogen-oxygen mixed gas atmosphere, for instance. The firing in a nitrogen-oxygen mixed gas atmosphere is preferred among others since the oxidation of europium functioning as an activator can then be prevented as far as possible. The mixing ratio between nitrogen and oxygen in the above-mentioned mixed gas is not particularly restricted but the nitrogen/oxygen ratio is preferably 99.9/0.1 to 95/5 (by volume) so that the oxidation of europium may be inhibited.

The nitrogen-oxygen mixed gas may retain the same mixing ratio from the initial stage to the end point of the firing. Alternatively, oxygen may be injected into the atmosphere in the course of firing if the coloration of or by the additive element can be eliminated thereby. On that occasion, the temperature, duration and time for oxygen injection are not particularly restricted but can be selected arbitrarily. The firing in an oxidizing atmosphere is preferably carried out in temperature range from the lower limit of 500° C. to the upper limit of 1000° C. so that the oxidation of europium may be inhibited as far as possible. The maximum temperature, after arrival thereof, is preferably maintained for 0 to 20 hours.

The alkaline earth metal aluminate phosphor of the invention can also be obtained by a process comprising; the step (2-1) of mixing a fired product (A) with a compound (B), wherein the fired product (A) comprises barium and/or strontium (a), magnesium (b), aluminum (c) and europium (d), and the compound (B) is at least one compound selected from the group consisting of indium compounds, tungsten compounds, niobium compounds, bismuth compounds, molybdenum compounds, tantalum compound, thallium compounds and lead compounds; and the step (2-2) of firing, in an oxidizing atmosphere, the mixture obtained in the above step (2-1) or a fired product of the mixture obtained in the above step (2-1), wherein the step (2-2) is preceded, at least once, by firing in a reducing atmosphere.

The fired product (A) is a fired product comprising barium and/or strontium (a), magnesium (b), aluminum (c) and europium (d) and can be prepared, for example, by firing a mixture of precursor compounds of barium and/or strontium (a), magnesium (b), aluminum (c) and europium (d), respectively.

The above-mentioned precursor compounds each is not particularly restricted but may be an oxide or any other compound capable of being converted to an oxide upon firing. Thus, those enumerated hereinabove may be used as the respective precursor compounds.

The fired product (A) may further contain at least one element (e) selected from the group consisting of indium, tungsten, niobium, bismuth, molybdenum, tantalum, thallium and lead.

The fired product (A) which contains the element (e) can be prepared by adding a desired amount of a precursor compound of at least one element (e) selected from the group consisting of tungsten, niobium, bismuth, molybdenum, tantalum, thallium and lead to a mixture of precursor compounds of (a) to (d), respectively. The precursor compound of the element (e) is not particularly restricted but those enumerated herein above may be used.

In preparing the fired product (A), a flux may further be used. The flux is not particularly restricted but those mentioned hereinabove may be used.

The mixture of the precursor compounds and the flux used according to need can be obtained by mixing up the respective components by any of the methods known in the art.

The method of mixing is not particularly restricted but any of those methods by which the respective components can be mixed up uniformly without aggregation of any single component, for example those methods described hereinabove.

The fired product (A) can be obtained, for example, by carrying out an arbitrary number of repetitions of the step of firing in an oxidizing atmosphere, such as the ambient atmosphere or a nitrogen-oxygen mixed gas atmosphere. As for the temperature and reaction time in the firing in the oxidizing atmosphere, those conditions described hereinabove referring to the optional firing in an oxidizing atmosphere.

The fired product (A) can also be obtained by firing the mixture mentioned above in a reducing atmosphere. The temperature and reaction time in the firing in the reducing atmosphere are preferably within the respective ranges mentioned hereinabove. Further, the reducing atmosphere conditions are preferably the same as those mentioned herein above.

The fired product (A) may also be one obtained by the above-mentioned optional firing in an oxidizing atmosphere and the subsequent firing in a reducing atmosphere. It may also be one obtained by a plurality of repetitions of the above-mentioned firing in an oxidizing atmosphere and the firing in a reducing atmosphere.

The above-mentioned step (2-1) is the step of mixing up the fired product (A) obtained in the above manner with at least one compound (B) selected from the group consisting of indium compounds, tungsten compounds, niobium compounds, bismuth compounds, molybdenum compounds, tantalum compounds, thallium compounds and lead compounds.

The compound (B) is not particularly restricted but, like in the case of the precursor compounds mentioned above, an oxide or any other compound capable of being converted to an oxide upon firing can be used. As for the respective compounds, mention may be made of those precursor compounds enumerated herein above. The method of mixing up the fired product (A) with the compound (B) in the step (2-1) is not particularly restricted but mention may be made, for example, of the dry mixing method using a ball mill or a blender, and the method comprising wet mixing in the presence of a solvent using an agitator such as a homogenizer or a media grinder such as a ball mill or a bead mill, followed by drying. The step (2-1) is preferably carried out using such a method, whereupon the fired product (A) can be ground and at the same time mixed with the compound (B).

The mixture obtained in the step (2-1) may be further fired and then submitted to the step (2-2) mentioned above. The firing following the step (2-1) may be carried out either in an oxidizing atmosphere or in a reducing atmosphere.

In producing the phosphor of the invention, the firing in a reducing atmosphere is carried out at least once prior to the above-mentioned step (2-2). When the firing in a reducing atmosphere is carried out at least once, europium is reduced and a phosphor with a sufficient level of luminance can be obtained. Preferably, the firing in a reducing atmosphere is applied to the mixture obtained in the above-mentioned step (2-1), or it is carried out in the step of firing for obtaining the fired product (A). When the firing in a reducing atmosphere is carried out in the step of firing for obtaining the fired product (A), the firing in the reducing atmosphere is preferably carried out after firing in an oxidizing atmosphere.

The above-mentioned step (2-2) is the step of firing, in an oxidizing atmosphere, the mixture obtained in the above-mentioned step (2-1). The firing in an oxidizing atmosphere makes it possible to attain such objects as the prevention of decreases in luminance and of luminous color shifting while retaining the powder whiteness of the phosphor.

The firing in an oxidizing atmosphere in the step (2-2) is not particularly restricted but is preferably carried out under the same conditions as in the firing in an oxidizing atmosphere as the last step.

The nitrogen-oxygen mixed gas may retain the same mixing ratio from the initial stage to the end point of the firing. Alternatively, oxygen may be injected into the atmosphere in the course of firing. On that occasion, the temperature, duration and time for or of oxygen injection are not particularly restricted but can be selected arbitrarily. The firing in an oxidizing atmosphere is preferably carried out in temperature range from the lower limit of 500° C. to the upper limit of 1000° C. so that the oxidation of europium may be inhibited as far as possible. The maximum temperature, after arrival thereof, is preferably maintained for 0 to 20 hours.

The alkaline earth metal aluminate phosphor obtained by the method mentioned above is preferably ground to adjust the particle diameter. As the grinder for use in the above grinding, there may be mentioned those described herein-above. Such a method of producing alkaline earth metal aluminate phosphors also constitutes a further aspect of the present invention.

The alkaline earth metal aluminate phosphor of the invention is excellent in quality also from the viewpoint that the luminous color shifting is inhibited. The luminous color shifting so referred to herein is the change in chromaticity of the light emitted by the alkaline earth metal aluminate phosphor, and a smaller change in chromaticity of the light emitted indicates a smaller change in luminous color, hence a higher degree of inhibition of luminous color shifting. The change in chromaticity of the light emitted can be calculated using the chromaticity (y) of the light emitted by the phosphor as measured by using a luminance meter (e.g. Otsuka Electronics model MCPD-3000) according to the following formula (3):

$$\Delta y = \text{chromaticity } (y2) \text{ of the light emitted after firing,} \\ \text{ultraviolet irradiation, etc.} - \text{chromaticity } (y1) \text{ of} \\ \text{the light emitted by the phosphor in powder form} \quad (3)$$

For example, a phosphor for which the change in chromaticity ($\Delta y$) of the light emitted between the measurement immediately after preparation and the measurement after the heating step comprising heating in the air at a rate of 150° C. per hour, maintaining the temperature of 500° C. for 1 hour and then cooling at a rate of 150° C. per hour is smaller than 0.01 can be regarded as being inhibited from luminous color shifting. When the change exceeds 0.01, the change in luminous color is great and the luminous color shifting inhibiting performance is unsatisfactory. More preferably, the above-mentioned change in chromaticity is not greater than 0.007.

The alkaline earth metal aluminate phosphor of the invention is excellent in heat resistance and in durability against vacuum ultraviolet rays or ultraviolet rays, and shows no luminance reduction or luminous color shifting, hence can be properly used in PDPs and in like applications. Furthermore, the above alkaline earth metal aluminate phosphor shows a high powder whiteness and therefore is excellent in fluorescence-emitting capacity.

BEST MODES FOR CARRYING OUT THE INVENTION

The following examples further illustrate the present invention. They are, however, by no means limitative of the scope of the invention.

Example 1

Using an electronic force balance, 24.11 g of barium carbonate (purity on analysis: 99.39% by weight), 2.1 g of strontium carbonate (purity on analysis: 99.5% by weight), 8.33 g of magnesium hydroxide (purity on analysis: 99.5% by weight), 73.32 g of aluminum oxide (purity on analysis: 99.27% by weight), 1.26 g of europium (III) oxide (99.6% by weight), 0.166 g of tungsten (VI) oxide (special reagent grade) and 1.19 g of aluminum fluoride (special reagent grade) were weighed, and they were mixed up in an automatic mortar (product of Nitto Kagaku Co., ANM-150) for 60 minutes. The mixture was then placed in an alumina crucible and fired in the ambient atmosphere by raising the temperature at a rate of 200° C. per hour and, after arrival at the maximum temperature of 1500° C., maintaining that temperature for 5 hours, followed by temperature lowering at a rate of 200° C. per hour. The thus-obtained fired product was ground in an automatic mortar for 10 minutes. Then, the fired product was subjected to reductive firing, in an electric oven maintained in a reducing atmosphere with a mixed gas composed of 10% by volume of hydrogen and 90% by volume of nitrogen, by raising the temperature at a rate of 200° C. per hour and, after arrival at the maximum temperature of 1500° C., maintaining that temperature for 5 hours, followed by temperature lowering at a rate of 200° C. per hour. The thus-obtained fired product was ground in an automatic mortar for 10 minutes. In the above manner, there was obtained an alkaline earth metal aluminate phosphor containing tungsten in an amount of 0.0005 mole as the element W per mole of aluminum.

Example 2

An alkaline earth metal aluminate phosphor containing tungsten in an amount of 0.001 mole as the element W per mole of aluminum was obtained in the same manner as in Example 1 except that 0.331 g of tungsten (VI) oxide (special reagent grade) was added in lieu of the addition of 0.166 g of tungsten (VI) oxide (special reagent grade).

Comparative Example 1

An alkaline earth metal aluminate phosphor was obtained in the same manner as in Example 1 except that the addition of 0.166 g of tungsten(VI) oxide (special reagent grade) was omitted.

(Heat Resistance Testing Method)

Two grams of each of the phosphors prepared in Examples 1 and 2 and Comparative Example 1 was weighed in a porcelain crucible and fired in an electric oven in the air by raising the temperature at a rate of 200° C. per hour and, after arrival at the temperature of 500° C., maintaining that temperature for 1 hour, followed by temperature lowering at a rate of 200° C. per hour. Separately, firing was carried out in the same manner except that the temperature maintenance was at 600° C., 700° C., 800° C. or 900° C. Using an Otsuka Electronics model MCPD-3000 fluorescence spectrophotometer, the values of luminance of each of the phosphors of Examples 1 and 2 and Comparative Example 1 before and after the oxidizing firing were determined. The percent luminance retentions were calculated according to the formula (luminance after firing)/(luminance before firing)×100, and the respective samples were compared with one another with respect to deterioration resistance in terms of the percent luminance retention after firing as compared with the luminance before firing. The results are shown in Table 1.

TABLE 1

| | Tungsten element content | Luminance retention (%) | | | | |
|---|---|---|---|---|---|---|
| | | 500° C. | 600° C. | 700° C. | 800° C. | 900° C. |
| Example1 | 0.0005 | 97.8 | 94.8 | 89.6 | 88.0 | 83.0 |
| Example2 | 0.001 | 100.2 | 96.4 | 90.8 | 89.1 | 82.2 |
| Comparative Example1 | — | 98.4 | 91.9 | 86.6 | 84.3 | 78.6 |

As is evident from the data shown in Table 1, the alkaline earth metal aluminate phosphors obtained in Examples 1 and 2 with tungsten added are both higher in luminance retention percentage after firing, hence improved in resistance to oxidation-due deterioration, as compared with the tungsten-free alkaline earth metal aluminate phosphor obtained in Comparative Example 1.

Example 3

Using an electronic force balance, 22.69 g of barium carbonate (purity on analysis: 99.39% by weight), 2.14 g of strontium carbonate (purity on analysis: 99.5% by weight), 8.33 g of magnesium hydroxide (purity on analysis: 99.5% by weight), 72.96 g of aluminum oxide (purity on analysis: 99.27% by weight), 2.52 g of europium (III) oxide (99.6% by weight), 0.197 g of indium (III) oxide and 1.20 g of aluminum fluoride (special reagent grade) were weighed, and they were mixed up in an automatic mortar for 60 minutes. The mixture was then placed in an alumina crucible and fired in the ambient atmosphere by raising the temperature at a rate of 200° C. per hour and, after arrival at the maximum temperature of 1500° C., maintaining that temperature for 5 hours, followed by temperature lowering at a rate of 200° C. per hour. The thus-obtained fired product was ground in an automatic mortar for 10 minutes. Then, the fired product was subjected to reductive firing, in an electric oven maintained in a reducing atmosphere with a mixed gas composed of 10% by volume of hydrogen and 90% by volume of nitrogen, by raising the temperature at a rate of 200° C. per hour and, after arrival at the maximum temperature of 1500° C., maintaining that temperature for 5 hours, followed by temperature lowering at a rate of 200° C. per hour. The thus-obtained fired product was ground in an automatic mortar for 10 minutes.

In the above manner, there was obtained an alkaline earth metal aluminate phosphor containing indium in an amount of 0.001 mole as the element In per mole of aluminum.

Example 4

An alkaline earth metal aluminate phosphor containing tungsten in an amount of 0.001 mole as the element W per mole of aluminum was obtained in the same manner as in Example 3 except that 0.329 g of tungsten (VI) oxide (special reagent grade) was added in lieu of the addition of 0.197 g of indium (III) oxide.

Example 5

An alkaline earth metal aluminate phosphor containing tungsten in an amount of 0.002 mole as the element W per mole of aluminum was obtained in the same manner as in Example 3 except that 0.658 g of tungsten (VI) oxide (special reagent grade) was added in lieu of the addition of 0.197 g of indium (III) oxide.

Example 6

An alkaline earth metal aluminate phosphor containing tungsten in an amount of 0.005 mole as the element W per mole of aluminum was obtained in the same manner as in Example 3 except that 1.66 g of tungsten (VI) oxide (special reagent grade) was added in lieu of the addition of 0.197 g of indium (III) oxide.

Example 7

An alkaline earth metal aluminate phosphor containing niobium in an amount of 0.001 mole as the element Nb per mole of aluminum was obtained in the same manner as in Example 3 except that 0.189 g of niobium(V) pentoxide was added in lieu of the addition of 0.197 g of indium(III) oxide.

Example 8

An alkaline earth metal aluminate phosphor containing niobium in an amount of 0.002 mole as the element Nb per mole of aluminum was obtained in the same manner as in Example 3 except that 0.378 g of niobium(V) pentoxide was added in lieu of the addition of 0.197 g of indium(III) oxide.

Example 9

An alkaline earth metal aluminate phosphor containing bismuth in an amount of 0.001 mole as the element Bi per mole of aluminum was obtained in the same manner as in Example 3 except that 0.331 g of bismuth(III) oxide was added in lieu of the addition of 0.197 g of indium(III) oxide.

Example 10

An alkaline earth metal aluminate phosphor containing molybdenum in an amount of 0.001 mole as the element Mo per mole of aluminum was obtained in the same manner as in Example 3 except that 0.205 g of molybdenum(VI) oxide was added in lieu of the addition of 0.197 g of indium(III) oxide.

Example 11

An alkaline earth metal aluminate phosphor containing tantalum in an amount of 0.001 mole as the element Ta per mole of aluminum was obtained in the same manner as in Example 3 except that 0.314 g of tantalum(V) oxide was added in lieu of the addition of 0.197 g of indium(III) oxide.

Example 12

An alkaline earth metal aluminate phosphor containing thallium in an amount of 0.001 mole as the element T1 per mole of aluminum was obtained in the same manner as in Example 3 except that 0.324 g of thallium(III) oxide was added in lieu of the addition of 0.197 g of indium(III) oxide.

Example 13

An alkaline earth metal aluminate phosphor containing lead in an amount of 0.001 mole as the element Pb per mole of aluminum was obtained in the same manner as in Example 3 except that 0.317 g of lead(II) oxide was added in lieu of the addition of 0.197 g of indium(III) oxide.

Comparative Example 2

An alkaline earth metal aluminate phosphor was obtained in the same manner as in Example 3 except that the addition of 0.197 g of indium(III) oxide was omitted.
(Heat Resistance Testing Method)

The phosphors prepared in Examples 3 to 13 and Comparative Example 2 were subjected to deterioration resistance evaluation at the predetermined maximum temperature of 900° C. in the same manner as in the heat resistance testing with the products of Examples 1 and 2 and Comparative Example 1, and the deterioration resistance features of the samples before and after firing were compared in terms of luminance retention percentage. The results are shown in Table 2.

TABLE 2

|  | Element species | Element content | Luminance retension(%) |
|---|---|---|---|
| Example3 | In | 0.001 | 82.6 |
| Example4 | W | 0.001 | 97.5 |
| Example5 | W | 0.002 | 96.2 |
| Example6 | W | 0.005 | 85.4 |
| Example7 | Nb | 0.001 | 83.0 |
| Example8 | Nb | 0.002 | 90.4 |
| Example9 | Bi | 0.001 | 87.0 |
| Example10 | Mo | 0.001 | 82.3 |
| Example11 | Ta | 0.001 | 83.1 |
| Example12 | Tl | 0.001 | 84.7 |
| Example13 | Pb | 0.001 | 82.5 |
| Comparative Example2 | — | — | 79.0 |

As is evident from the results shown in Table 2, the alkaline earth metal aluminate phosphors obtained in Examples 3 to 13 all showed improved luminance retention percentages after firing, hence were improved in deterioration resistance, as compared with the alkaline earth metal aluminate phosphor of Comparative Example 2.

Example 14

An alkaline earth metal aluminate phosphor containing tungsten in an amount of 0.0005 mole as the element W per mole of aluminum was obtained in the same manner as in Example 3 except that 0.166 g of tungsten (VI) oxide (special reagent grade) was added in lieu of the addition of 0.197 g of indium(III) oxide.

Example 15

An alkaline earth metal aluminate phosphor containing niobium in an amount of 0.0005 mole as the element Nb per mole of aluminum was obtained in the same manner as in Example 3 except that 0.095 g of niobium(V) pentoxide was added in lieu of the addition of 0.197 g of indium(III) oxide.
(Deterioration Testing by Vacuum Ultraviolet Irradiation)

The alkaline earth metal aluminate phosphors obtained in Examples 4, 14 and 15 and Comparative Example 2 were subjected to testing for deterioration with the passage of time under vacuum ultraviolet irradiation. In carrying out the test, test films to be irradiated with vacuum ultraviolet rays were first prepared. Thus, each of the alkaline earth metal aluminate phosphors obtained in the examples and comparative example was mixed with ethylcellulose (product of Dow Chemical, STD-10) and terpineol (special reagent grade) in a ratio of 17.5:1:9 on the weight basis, and the mixture was dispersed on a Hoover muller to give a phosphor paste. Each phosphor paste was applied onto a slide glass to give a 2×2 cm square film with a dry film thickness of 20 μm, and the film was fired in the air at 500° C. for 20 minutes to remove the binder and solvent components.

The thus-obtained fired films were used as test specimens. Each test specimen was irradiated with ultraviolet rays at 147 nm under vacuum (≤5 Pa) for 2 hours using a vacuum ultraviolet lamp (product of Ushio Inc.). The luminance after irradiation was measured, and the luminance retention percentage, i.e. (luminance after irradiation/luminance before irradiation)×100, was calculated. Based on the luminance retention data thus obtained, the extents of deterioration of the test specimens before and after irradiation were compared with one another. The results are shown in Table 3.

TABLE 3

| | Element species | Element content | Luminance retension(%) |
|---|---|---|---|
| Example4 | W | 0.001 | 92 |
| Example14 | W | 0.0005 | 90 |
| Example15 | Nb | 0.0005 | 95 |
| Comparative Example2 | — | — | 85 |

As is evident from the results shown in Table 3, the alkaline earth metal aluminate phosphors produced in Examples 4, 14 and 15 according to the invention showed improved luminance retention percentages higher by 5 to 10% as compared with the alkaline earth metal aluminate phosphor of Comparative Example 2. Thus, the present invention produces not only the effect of inhibiting deterioration due to oxidation but also the effect of preventing the progress of deterioration due to vacuum ultraviolet rays.

Example 16

A fired product was obtained in the same manner as in Example 1 except that 0.198 g of indium(III) oxide (special reagent grade) was added in lieu of the addition of 0.166 g of tungsten(VI) oxide (special reagent grade). The fired product was further fired in an electric oven maintained in an oxidizing atmosphere with a mixed gas composed of 10% by volume of oxygen and 90% by volume of nitrogen by raising the temperature at a rate of 200° C. per hour and, after arrival at the maximum temperature of 800° C., maintaining that temperature for 1 hour, followed by cooling at a rate of 200° C. per hour. The thus-obtained fired product was pulverized in an automatic mortar for 5 minutes.

In the above manner, there was obtained an alkaline earth metal aluminate phosphor containing indium in an amount of 0.001 mole as the element In per mole of the aluminum element.

Example 17

An alkaline earth metal aluminate phosphor (B) containing tungsten in an amount of 0.001 mole as the element W per mole of the aluminum element was obtained in the same manner as in Example 16 except that 0.331 g of tungsten(VI) oxide (special reagent grade) was added in lieu of the addition of 0.198 g of indium(III) oxide(special reagent grade).

Example 18

An alkaline earth metal aluminate phosphor containing niobium in an amount of 0.001 mole as the element Nb per mole of the aluminum element was obtained in the same manner as in Example 16 except that 0.190 g of niobium(V) oxide (special reagent grade) was added in lieu of the addition of 0.198 g of indium(III) oxide (special reagent grade).

Example 19

An alkaline earth metal aluminate phosphor containing bismuth in an amount of 0.001 mole as the element Bi per mole of the aluminum element was obtained in the same manner as in Example 16 except that 0.333 g of bismuth(III) oxide (special reagent grade) was added in lieu of the addition of 0.198 g of indium(III) oxide (special reagent grade).

Example 20

An alkaline earth metal aluminate phosphor containing molybdenum in an amount of 0.001 mole as the element Mo per mole of the aluminum element was obtained in the same manner as in Example 16 except that 0.206 g of molybdenum (VI) oxide (special reagent grade) was added in lieu of the addition of 0.198 g of indium(III) oxide (special reagent grade).

Example 21

An alkaline earth metal aluminate phosphor containing tantalum in an amount of 0.001 mole as the element Ta per mole of the aluminum element was obtained in the same manner as in Example 16 except that 0.315 g of tantalum(V) oxide (special reagent grade) was added in lieu of the addition of 0.198 g of indium(III) oxide (special reagent grade).

Example 22

An alkaline earth metal aluminate phosphor containing thallium in an amount of 0.001 mole as the element Tl per mole of the aluminum element was obtained in the same manner as in Example 16 except that 0.326 g of thallium(III) oxide (special reagent grade) was added in lieu of the addition of 0.198 g of indium(III) oxide (special reagent grade).

Example 23

An alkaline earth metal aluminate phosphor containing lead in an amount of 0.001 mole as the element Pb per mole of the aluminum element was obtained in the same manner as in Example 16 except that 0.319 g of lead(II) oxide (special reagent grade) was added in lieu of the addition of 0.198 g of indium(III) oxide (special reagent grade).

Example 24

An alkaline earth metal aluminate phosphor containing indium in an amount of 0.001 mole as the element In per mole of the aluminum element but not fired in any oxidizing atmosphere was obtained in the same manner as in Example 1 except that 0.198 g of indium(III) oxide (special reagent grade) was added in lieu of the addition of 0.166 g of tungsten (VI) oxide (special reagent grade).

Example 25

An alkaline earth metal aluminate phosphor containing niobium in an amount of 0.001 mole as the element Nb per mole of the aluminum element was obtained in the same manner as in Example 1 except that 0.190 g of niobium(V) oxide (special reagent grade) was added in lieu of the addition of 0.166 g of tungsten(VI) oxide (special reagent grade).

Example 26

An alkaline earth metal aluminate phosphor containing bismuth in an amount of 0.001 mole as the element Bi per mole of the aluminum element was obtained in the same manner as in Example 1 except that 0.333 g of bismuth(III) oxide (special reagent grade) was added in lieu of the addition of 0.166 g of tungsten(VI) oxide (special reagent grade).

Example 27

An alkaline earth metal aluminate phosphor containing molybdenum in an amount of 0.001 mole as the element Mo per mole of the aluminum element was obtained in the same manner as in Example 1 except that 0.206 g of molybdenum (VI) oxide (special reagent grade) was added in lieu of the addition of 0.166 g of tungsten(VI) oxide (special reagent grade).

Example 28

An alkaline earth metal aluminate phosphor containing tantalum in an amount of 0.001 mole as the element Ta per mole of the aluminum element was obtained in the same manner as in Example 1 except that 0.315 g of tantalum(V) oxide (special reagent grade) was added in lieu of the addition of 0.166 g of tungsten(VI) oxide (special reagent grade).

Example 29

An alkaline earth metal aluminate phosphor containing thallium in an amount of 0.001 mole as the element Tl per mole of the aluminum element was obtained in the same manner as in Example 1 except that 0.326 g of thallium(III) oxide (special reagent grade) was added in lieu of the addition of 0.166 g of tungsten(VI) oxide (special reagent grade).

Example 30

An alkaline earth metal aluminate phosphor containing lead in an amount of 0.001 mole as the element Pb per mole of the aluminum element was obtained in the same manner as in Example 1 except that 0.319 g of lead(II) oxide (special reagent grade) was added in lieu of the addition of 0.166 g of tungsten(VI) oxide (special reagent grade).

(Method of Powder Whiteness Measurement)

Each of the alkaline earth metal aluminate phosphors obtained in Examples 2 and 16 to 30 was packed in a vessel with a diameter of 10 mm and a depth of 5 mm and, after smoothening the surface, the Hunter color model L, a and b values were measured using a color meter (product of Suga Test Instruments; trademark: SM Color Computer, SM-4) and the W value was calculated. The results thus obtained are shown in Table 4.

TABLE 4

| | Element added | Oxidative firing | L | a | b | W |
|---|---|---|---|---|---|---|
| Example16 | In | Done | 91.3 | −0.11 | −3.05 | 90.7 |
| Example17 | W | Done | 95.2 | 0.22 | −3 | 94.3 |
| Example18 | Nb | Done | 95.1 | −0.07 | −3.03 | 94.2 |
| Example19 | Bi | Done | 89.1 | −0.05 | −2.45 | 88.8 |
| Example20 | Mo | Done | 92.3 | 0.21 | −2.98 | 91.7 |
| Example21 | Ta | Done | 94.7 | 0.28 | −3.19 | 93.8 |
| Example22 | Tl | Done | 90.9 | −0.10 | −2.88 | 90.5 |
| Example23 | Pb | Done | 94.6 | 0.22 | −3.01 | 93.8 |
| Example24 | In | Not done | 88.7 | −0.34 | −4.49 | 87.8 |
| Example2 | W | Not done | 87.6 | 0.15 | −1.40 | 87.5 |

TABLE 4-continued

| | Element added | Oxidative firing | L | a | b | W |
|---|---|---|---|---|---|---|
| Example25 | Nb | Not done | 91.9 | −0.57 | −3.87 | 91.0 |
| Example26 | Bi | Not done | 70.6 | 0.65 | −1.38 | 70.5 |
| Example27 | Mo | Not done | 86.8 | 0.11 | −1.60 | 86.7 |
| Example28 | Ta | Not done | 74.6 | 1.87 | −0.99 | 74.5 |
| Example29 | Tl | Not done | 85.8 | −0.43 | −5.51 | 84.8 |
| Example30 | Pb | Not done | 93.0 | 0.55 | −4.06 | 91.9 |

Table 4 indicates that the phosphors of Examples 16 to 23 which had been subjected to firing in an oxidizing atmosphere as the last step were higher in powder whiteness than the phosphors containing the respective same additive elements but not subjected to firing in any oxidizing atmosphere.

Comparative Example 3

An alkaline earth metal aluminate phosphor was obtained in the same manner as in Example 16 except that the addition of 0.198 g of indium oxide was omitted.

(Method of Deterioration Testing by Vacuum Ultraviolet Irradiation)

The phosphors obtained in Examples 16 to 23 and Comparative Examples 1 and 3 were subjected to powder luminance measurement and to deterioration testing by vacuum ultraviolet irradiation. Prior to testing, test specimens were first prepared from the powder-form phosphors themselves as obtained in Examples 16 to 23 and Comparative Examples 1 and 3 in the same manner as in the powder whiteness measurement, and the emissive luminance and emissive chromaticity (y value) of each specimen were measured using an Otsuka Electronics model MCPD-3000 luminance meter. Then, test specimens for ultraviolet irradiation were prepared in the same manner as in the above-mentioned deterioration testing by vacuum ultraviolet irradiation. The fired films obtained were used as test specimens, and each test specimen was irradiated with ultraviolet rays at 147 nm under vacuum (≦5 Pa) for 2 hours using a vacuum ultraviolet lamp (product of Ushio Inc.).

The difference (emissive chromaticity (y value) of the fired film)−(emissive chromaticity (y value) in powder form) was defined as change in chromaticity (Δy), and the changes were compared. Further, luminance measurements were carried out before and after vacuum ultraviolet irradiation, and the value (luminance after irradiation)/(luminance before irradiation)×100, which was defined as luminance retention percentage, was calculated for each phosphor, and the extents of deterioration of the respective samples before and after firing were compared based on the luminance retention percentage values obtained. The results are shown in Table 5. The luminance values shown in Table 5 are relative luminance values converted from the measured luminance values in the respective tests taking the measured luminance value of the powder of Comparative Example 3 as 100.

TABLE 5

| | | Element added | Oxidative firing | Powder luminance | Film luminance | After vacuum UV irradiation | Luminance retention | Change in chromaticity |
|---|---|---|---|---|---|---|---|---|
| Example | 16 | In | Done | 105 | 103 | 95 | 92 | 0.002 |
| | 17 | W | Done | 114 | 114 | 108 | 95 | 0.000 |
| | 18 | Nb | Done | 110 | 108 | 105 | 97 | 0.001 |
| | 19 | Bi | Done | 102 | 100 | 93 | 93 | 0.003 |
| | 20 | Mo | Done | 104 | 100 | 93 | 93 | 0.002 |
| | 21 | Ta | Done | 102 | 98 | 90 | 92 | 0.002 |
| | 22 | Tl | Done | 103 | 99 | 92 | 93 | 0.003 |
| | 23 | Pb | Done | 105 | 100 | 92 | 92 | 0.004 |

TABLE 5-continued

| | Element added | Oxidative firing | Powder luminance | Film luminance | After vacuum UV irradiation | Luminance retention | Change in chromaticity |
|---|---|---|---|---|---|---|---|
| Comparative Example | 3 | — | Done | 100 | 97 | 86 | 89 | 0.006 |
| Example | 1 | — | Not done | 115 | 116 | 96 | 83 | 0.031 |

The results shown in Table 5 indicate that the tungsten-containing phosphor of Example 17 and the niobium-containing phosphor of Example 18, in particular, showed increases, by 10% or more, in luminance after vacuum ultraviolet irradiation as compared with the phosphors of Comparative Examples 1 and 3, which indicates marked prevention of deterioration by vacuum ultraviolet rays.

It was also shown that the luminance was high but the luminous color shifting was great in Comparative Example 1 whereas the phosphors of Examples 16 to 23 showed very slight changes in emission chromaticity, indicating the prevention of luminous color shifting.

Example 31

Using an electronic force balance, 24.11 g of barium carbonate (purity on analysis: 99.39% by weight), 2.1 g of strontium carbonate (purity on analysis: 99.5% by weight), 8.33 g of magnesium hydroxide (purity on analysis: 99.5% by weight), 73.32 g of aluminum oxide (purity on analysis: 99.27% by weight), 1.26 g of europium(III) oxide (99.6% by weight) and 1.19 g of aluminum fluoride (special reagent grade) were weighed, and they were mixed up in an automatic mortar for 60 minutes. The mixture was then placed in an alumina crucible and fired in the ambient atmosphere by raising the temperature at a rate of 200° C. per hour and, after arrival at the maximum temperature of 1500° C., maintaining that temperature for 5 hours, followed by temperature lowering at a rate of 200° C. per hour. Using an electronic force balance, 0.198 g of indium(III) oxide (special reagent grade) was weighed, and ground and admixed in an automatic mortar with the fired product obtained as described above for 10 minutes for additive incorporation and simultaneous fired product comminution. The resulting mixture was then subjected to reductive firing, in an electric oven maintained in a reducing atmosphere with a mixed gas composed of 10% by volume of hydrogen and 90% by volume of nitrogen, by raising the temperature at a rate of 200° C. per hour and, after arrival at the maximum temperature of 1500° C., maintaining that temperature for 5 hours, followed by temperature lowering at a rate of 200° C. per hour. The thus-obtained fired product was ground in an automatic mortar for 10 minutes. The fired product was further subjected to oxidative firing, in an electric oven maintained in an oxidizing atmosphere with a mixed gas composed of 10% by volume of oxygen and 90% by volume of nitrogen, by raising the temperature at a rate of 200° C. per hour and, after arrival at the maximum temperature of 800° C., maintaining that temperature for 1 hour, followed by temperature lowering at a rate of 200° C. per hour. The thus-obtained fired product was ground in an automatic mortar for 5 minutes. In this manner, there was obtained an alkaline earth metal aluminate phosphor containing indium in an amount of 0.001 mole as the element In per mole of the aluminum element.

Example 32

An alkaline earth metal aluminate phosphor containing tungsten in an amount of 0.001 mole as the element W per mole of the aluminum element was obtained in the same manner as in Example 31 except that 0.331 g of tungsten(VI) oxide (special reagent grade) was added in lieu of the addition of 0.198 g of indium(III) oxide (special reagent grade).

Example 33

An alkaline earth metal aluminate phosphor containing niobium in an amount of 0.001 mole as the element Nb per mole of the aluminum element was obtained in the same manner as in Example 31 except that 0.190 g of niobium(V) oxide (special reagent grade) was added in lieu of the addition of 0.198 g of indium(III) oxide (special reagent grade).

Example 34

An alkaline earth metal aluminate phosphor containing bismuth in an amount of 0.001 mole as the element Bi per mole of the aluminum element was obtained in the same manner as in Example 31 except that 0.333 g of bismuth(III) oxide (special reagent grade) was added in lieu of the addition of 0.198 g of indium(III) oxide (special reagent grade).

Example 35

An alkaline earth metal aluminate phosphor containing molybdenum in an amount of 0.001 mole as the element Mo per mole of the aluminum element was obtained in the same manner as in Example 31 except that 0.206 g of molybdenum (VI) oxide (special reagent grade) was added in lieu of the addition of 0.198 g of indium(III) oxide (special reagent grade).

Example 36

An alkaline earth metal aluminate phosphor containing tantalum in an amount of 0.001 mole as the element Ta per mole of the aluminum element was obtained in the same manner as in Example 31 except that 0.315 g of tantalum(V) oxide (special reagent grade) was added in lieu of the addition of 0.198 g of indium(III) oxide (special reagent grade).

Example 37

An alkaline earth metal aluminate phosphor containing thallium in an amount of 0.001 mole as the element Tl per mole of the aluminum element was obtained in the same manner as in Example 31 except that 0.326 g of thallium(III) oxide (special reagent grade) was added in lieu of the addition of 0.198 g of indium(III) oxide (special reagent grade).

Example 38

An alkaline earth metal aluminate phosphor containing lead in an amount of 0.001 mole as the element Pb per mole of the aluminum element was obtained in the same manner as in Example 31 except that 0.319 g of lead(II) oxide (special reagent grade) was added in lieu of the addition of 0.198 g of indium(III) oxide (special reagent grade).

Example 39

Using an electronic force balance, 24.11 g of barium carbonate (purity on analysis: 99.39% by weight), 2.1 g of strontium carbonate (purity on analysis: 99.5% by weight), 8.33 g of magnesium hydroxide (purity on analysis: 99.5% by weight), 73.32 g of aluminum oxide (purity on analysis: 99.27% by weight), 1.26 g of europium(III) oxide (purity on analysis: 99.6% by weight) and 1.19 g of aluminum fluoride (special reagent grade) were weighed, and they were mixed up in an automatic mortar (product of Nitto Kagaku Co., ANM-150) for 60 minutes. The mixture was then placed in an alumina crucible and fired in the ambient atmosphere by raising the temperature at a rate of 200° C. per hour and, after arrival at the maximum temperature of 1500° C., maintaining that temperature for 5 hours, followed by temperature lowering at a rate of 200° C. per hour. The fired product obtained was ground in an automatic mortar for 10 minutes and then subjected to reductive firing, in an electric oven maintained in a reducing atmosphere with a mixed gas composed of 10% by volume of hydrogen and 90% by volume of nitrogen, by raising the temperature at a rate of 200° C. per hour and, after arrival at the maximum temperature of 1500° C., maintaining that temperature for 5 hours, followed by temperature lowering at a rate of 200° C. per hour. Using an electronic force balance, 0.331 g of tungsten (VI) oxide (special reagent grade) was weighed and ground/admixed in an automatic mortar with the fired product obtained as described above for 10 minutes for additive incorporation and simultaneous fired product comminution. The resulting mixture was further subjected to oxidative firing, in an electric oven maintained in an oxidizing atmosphere with a mixed gas composed of 10% by volume of oxygen and 90% by volume of nitrogen, by raising the temperature at a rate of 200° C. per hour and, after arrival at the maximum temperature of 800° C., maintaining that temperature for 1 hour, followed by temperature lowering at a rate of 200° C. per hour. The thus-obtained fired product was ground in an automatic mortar for 5 minutes. In this manner, there was obtained an alkaline earth metal aluminate phosphor containing tungsten in an amount of 0.001 mole as the element W per mole of the aluminum element.

Example 40

An alkaline earth metal aluminate phosphor containing molybdenum in an amount of 0.001 mole as the element Mo per mole of the aluminum element was obtained in the same manner as in Example 39 except that 0.206 g of molybdenum (VI) oxide (special reagent grade) was added in lieu of the addition of 0.331 g of tungsten(VI) oxide (special reagent grade).

Example 41

An alkaline earth metal aluminate phosphor containing bismuth in an amount of 0.001 mole as the element Bi per mole of the aluminum element was obtained in the same manner as in Example 39 except that 0.333 g of bismuth(III) oxide (special reagent grade) was added in lieu of the addition of 0.331 g of tungsten(VI) oxide (special reagent grade).

(Method of Powder Whiteness Measurement)

The Hunter color model L, a and b values of the alkaline earth metal aluminate phosphors obtained in Examples 2 and 24 to 41 were measured, and the W values were calculated. The results are shown in Table 6.

TABLE 6

| | Element added | Time of addition | Oxidative firing | L | a | b | W |
|---|---|---|---|---|---|---|---|
| Example 31 | In | Just before reductive firing | Done | 94.2 | 0.01 | −2.87 | 93.4 |
| Example 32 | W | | Done | 94.8 | 0.18 | −2.80 | 94.1 |
| Example 33 | Nb | | Done | 93.8 | −0.10 | −3.25 | 93.0 |
| Example 34 | Bi | | Done | 91.5 | 0.05 | −2.60 | 91.1 |
| Example 35 | Mo | | Done | 91.8 | 0.16 | −2.52 | 91.4 |
| Example 36 | Ta | | Done | 94.4 | −0.02 | −2.63 | 93.8 |
| Example 37 | Tl | | Done | 90.5 | 0.14 | −3.10 | 90.0 |
| Example 38 | Pb | | Done | 94.1 | 0.02 | −2.85 | 93.4 |
| Example 39 | W | Just before oxidative firing | Done | 94.3 | 0.10 | −3.76 | 93.2 |
| Example 40 | Mo | | Done | 94.3 | 0.27 | −4.55 | 92.7 |
| Example 41 | Bi | | Done | 95.0 | 0.94 | −3.66 | 93.8 |
| Example 24 | In | Just before firing in the air | Not done | 88.7 | −0.34 | −4.49 | 87.8 |
| Example 2 | W | | Not done | 87.6 | 0.15 | −1.40 | 87.5 |
| Example 25 | Nb | | Not done | 91.9 | −0.57 | −3.87 | 91.0 |
| Example 26 | Bi | | Not done | 70.6 | 0.65 | −1.38 | 70.5 |
| Example 27 | Mo | | Not done | 86.7 | 0.11 | −1.60 | 86.7 |
| Example 28 | Ta | | Not done | 74.6 | 1.87 | −0.99 | 74.5 |
| Example 29 | Tl | | Not done | 85.8 | −0.43 | −5.51 | 84.8 |
| Example 30 | Pb | | Not done | 93.0 | 0.55 | −4.06 | 91.9 |

The data shown in Table 6 indicate that the phosphors fired in an oxidizing atmosphere in the last step were higher in powder whiteness than the phosphors containing the same respective additive elements but not subjected to firing in an oxidizing atmosphere as the last step.

Comparative Example 4

An alkaline earth metal aluminate phosphor was obtained in the same manner as in Example 31 except that the addition of 0.198 g of indium oxide was omitted.

(Method of Deterioration Testing by Vacuum Ultraviolet Irradiation)

The alkaline earth metal aluminate phosphors obtained in Examples 31 to 41 and Comparative Examples 1 and 4 were subjected to powder luminance measurement and to deterioration testing by vacuum ultraviolet irradiation by the same method as the above-mentioned method of deterioration testing by vacuum ultraviolet irradiation. The luminance values are shown as relative luminance values with the measured luminance value of the powder of Comparative Example 4 being taken as 100.

TABLE 7

|  |  | Element added | Time of addition | Oxidative firing | Powder luminance | Film luminance | After vacuum UV irradiation | Luminance retention | Change in chromaticity |
|---|---|---|---|---|---|---|---|---|---|
| Example | 31 | In | Just before | Done | 106 | 104 | 97 | 93 | 0.004 |
|  | 32 | W | reductive | Done | 110 | 108 | 105 | 97 | 0.000 |
|  | 33 | Nb | firing | Done | 112 | 111 | 108 | 97 | 0.001 |
|  | 34 | Bi |  | Done | 101 | 99 | 94 | 95 | 0.002 |
|  | 35 | Mo |  | Done | 105 | 103 | 97 | 94 | 0.002 |
|  | 36 | Ta |  | Done | 100 | 99 | 90 | 91 | 0.003 |
|  | 37 | Tl |  | Done | 106 | 102 | 94 | 92 | 0.003 |
|  | 38 | Pb |  | Done | 103 | 98 | 90 | 92 | 0.004 |
|  | 39 | W | Just before | Done | 115 | 113 | 108 | 96 | 0.000 |
|  | 40 | Mo | oxidative | Done | 102 | 101 | 96 | 95 | 0.001 |
|  | 41 | Bi | firing | Done | 98 | 97 | 90 | 93 | 0.001 |
| Comparative | 4 | — | — | Done | 100 | 97 | 86 | 89 | 0.006 |
| Example | 1 | — | — | Not done | 130 | 116 | 98 | 83 | 0.031 |

It was shown that the phosphors fired in an oxidizing atmosphere in the last step showed improvements, by at least 10%, in luminance after vacuum ultraviolet irradiation, hence markedly reduced deteriorations due to vacuum ultraviolet rays, as compared with the phosphors not subjected to such firing in an oxidizing atmosphere. It was also shown that the luminance was high but the luminous color shifting was remarkable in Comparative Example 1, whereas the phosphors of Examples 31 to 41 showed very slight changes in emitted light chromaticity, indicating the prevention of luminous color shifting.

It was further shown that the phosphors of Examples 31 to 38 and the phosphors of Examples 39 to 41 showed improved luminance values after vacuum ultraviolet irradiation and very great extents of deterioration prevention in spite of the different steps of addition of indium, tungsten, niobium, bismuth, molybdenum, tantalum, thallium and lead, respectively.

INDUSTRIAL APPLICABILITY

The alkaline earth metal aluminate phosphor of the invention is a phosphor excellent in luminance retention performance with the deterioration with time and the luminous color shifting upon heating and vacuum ultraviolet irradiation being markedly suppressed and, therefore, when it is applied in manufacturing PDPs and the like, the deterioration thereof in the manufacturing process can be prevented. Furthermore, the alkaline earth metal aluminate phosphor of the invention is a phosphor showing a high powder whiteness and excellent in fluorescence reflecting properties and therefore causes no function lowering due to the absorption of the fluorescence emitted.

The invention claimed is:
1. A fluorescent material, comprising:
an alkaline earth metal aluminate phosphor of a type exhibiting fluorescence, said alkaline earth metal aluminate phosphor comprising:
bivalent europium as an activator;
barium and/or strontium;
magnesium;
aluminum; and
at least one element (e) selected from the group consisting of indium, tungsten, niobium, bismuth, molybdenum, tantalum, thallium and lead, wherein the fluorescent material is obtained by a process comprising the steps of (2-1) of mixing a fired product (A) with a compound (B), said fired product (A) comprising barium and/or strontium (a), magnesium (b), aluminum (c) and europium (d), said compound (B) comprising at least one compound selected from the group consisting of indium compounds, tungsten compounds, niobium compounds, bismuth compounds, molybdenum compounds, tantalum compounds, thallium compounds and lead compounds; and a step (2-2) of firing, in an oxidizing atmosphere, the mixture obtained in the step (2-1) or a fired product of the mixture obtained in the step (2-1), said step (2-2) being preceded, at least once, by firing in a reducing atmosphere.

2. The fluorescent material according to claim 1, wherein the content of the at least one element (e) selected from the group consisting of indium, tungsten, niobium, bismuth, molybdenum, tantalum, thallium and lead is within a range of 0.0001 to 0.01 mole per mole of the aluminum element.

3. The fluorescent material according to claim 1, wherein the material has a powder whiteness of not lower than 85 as expressed in terms of W value.

4. The fluorescent material according to claim 1, wherein the alkaline earth metal aluminate phosphor exhibits an emission decay of sufficiently short duration so as to be suitable for use in a plasma display panel.

5. A fluorescent material comprising:
an alkaline earth metal aluminate phosphor of a type exhibiting fluorescence, said alkaline earth metal aluminate phosphor comprising:
bivalent europium as an activator;
barium and/or strontium;
magnesium;
aluminum; and
at least one element (e) selected from the group consisting of indium, tungsten, niobium, bismuth, molybdenum, tantalum, thallium and lead, wherein the alkaline earth metal aluminate phosphor containing bivalent europium as an activator comprises a compound represented by the following general formula (1):

$$(Ba_{1-X}SR_X)_{1-Y}Eu_YMgAl_{10}O_{17} \qquad (1),$$

wherein X satisfies a relationship of $0 \leq X \leq 0.3$ and Y satisfies a relationship of $0 \leq Y \leq 0.2$.

6. A method of producing a fluorescent material, comprising:
an alkaline earth metal aluminate phosphor of a type exhibiting fluorescence, said alkaline earth metal aluminate phosphor comprising:
bivalent europium as an activator;
barium and/or strontium;
magnesium;
aluminum; and
at least one element (e) selected from the group consisting of indium, tungsten, niobium, bismuth, molybdenum, tantalum, thallium and lead, the method comprising the steps (1-3) and (1-1) of consecutively firing, in an oxidizing atmosphere and then in a reducing atmosphere, a mixture of precursor compounds of barium and/or strontium (a), magnesium (b), aluminum (c), europium (d) and at least one element (e) selected from the group consisting of indium, tungsten, niobium, bismuth, molybdenum, tantalum, thallium and lead, respectively, or a fired product of said mixture.

7. The method according to claim 6, further comprising the step (1-2) of firing, in an oxidizing atmosphere, the fired product obtained in the step (1-1) of firing in a reducing atmosphere.

8. The method according to claim 6 or 7, comprising:
a step (2-1) of mixing a fired product (A) with a compound (B), said fired product (A) comprising barium and/or strontium (a), magnesium (b), aluminum (c) and europium (d), said compound (B) comprising at least one compound selected from the group consisting of indium compounds, tungsten compounds, niobium compounds, bismuth compounds, molybdenum compounds, tantalum compounds, thallium compounds and lead compounds; and
a step (2-2) of firing, in an oxidizing atmosphere, the mixture obtained in the step (2-1) or a fired product of the mixture obtained in the step (2-1), said step (2-2) being preceded, at least once, by firing in a reducing atmosphere.

9. The method according to claim 8, wherein said fired product (A) further comprises at least one element (e) selected from the group consisting of indium, tungsten, niobium, bismuth, molybdenum, tantalum, thallium and lead.

10. The method according to claim 8, wherein said firing in a reducing atmosphere comprises firing the mixture obtained in the step (2-1).

11. The method according to claim 8, wherein said firing in a reducing atmosphere comprises firing product (A) for producing the fired product (A) comprising barium and/or strontium (a), magnesium (b), aluminum (c) and europium (d).

12. A fluorescent material, comprising:
an alkaline earth metal aluminate phosphor being of a type exhibiting fluorescence, said alkaline earth metal aluminate phosphor comprising bivalent europium as an activator, barium and/or strontium, magnesium, aluminum and at least one element (e) selected from the group consisting of indium, tungsten, niobium, bismuth, molybdenum, tantalum, thallium and lead, a content of the at least one element (e) being within a range of 0.0001 to 0.01 mole per mole of said aluminum; and
said alkaline earth metal aluminate fluorescence-type phosphor being comprised of a compound represented by the following general formula (I):

$$(Ba_{1-X}SR_X)_{1-Y}Eu_YMgAl_{10}O_{17} \quad (1),$$

wherein X satisfies a relationship of $0 \leq X \leq 0.3$ and Y satisfies a relationship of $0 < Y \leq 0.2$.

* * * * *